United States Patent
Mancinelli et al.

(12) 
(10) Patent No.: US 6,735,961 B2
(45) Date of Patent: May 18, 2004

(54) DEVICE AND METHOD FOR REDUCING GAS PERMEABILITY IN A REFRIGERATION CIRCUIT

(75) Inventors: Piero Mancinelli, Grottammare (IT); Gianluca Dolente, Alba Adriatica (IT); Vincenzo Salvia, Colli del Tronto (IT)

(73) Assignee: Manuli Automotive S.p.A., Trezzano Sul Naviglio (IT)

( * ) Notice: Subject to any disclaimer, the term of this patent is extended or adjusted under 35 U.S.C. 154(b) by 0 days.

(21) Appl. No.: 10/417,084

(22) Filed: Apr. 17, 2003

(65) Prior Publication Data

US 2003/0200756 A1 Oct. 30, 2003

(30) Foreign Application Priority Data

Apr. 24, 2002 (IT) ...................................... MI2002A0888

(51) Int. Cl.[7] .............................................. F25D 17/00
(52) U.S. Cl. ............................................ 62/56; 62/498
(58) Field of Search ............................... 62/56, 86, 115, 62/171, 173, 498

(56) References Cited

U.S. PATENT DOCUMENTS

| | | | |
|---|---|---|---|
| 5,368,067 A | * | 11/1994 | Cook, Jr. ..................... 137/485 |
| 5,634,355 A | * | 6/1997 | Cheng et al. ................. 62/632 |
| 6,571,552 B2 | * | 6/2003 | Ban et al. ..................... 60/312 |

* cited by examiner

*Primary Examiner*—Melvin Jones
(74) *Attorney, Agent, or Firm*—Guido Modiano; Albert Josif; Daniel O'Byrne

(57) ABSTRACT

A device for reducing the permeability of tubing in climate control, air conditioning and refrigeration systems, comprising elements for recovering gas escaped by permeation from at least one tube that is at a first temperature and pressure, adapted to convey the permeated gas to a region of the system that is at a second temperature and pressure, the second pressure being lower than the first pressure.

7 Claims, 2 Drawing Sheets

DEVICE AND METHOD FOR REDUCING GAS PERMEABILITY IN A REFRIGERATION CIRCUIT

BACKGROUND OF THE INVENTION

The present invention relates to a device and a method for reducing gas permeability in a refrigeration cycle. More particularly, the invention relates to a device and a method for reducing the permeability of a mobile refrigeration circuit for climate control in vehicles and refrigeration systems in general.

As is known, any energy transformation entails an impact on the environment, which can be harmful depending on the elements being used. For example, in the case of vehicle climate control, the corresponding energy transformation contributes to global warming in two ways: a direct one and an indirect one.

Direct warming occurs due to the dispersion into the atmosphere of the gas used in the climate control system.

Indirect heating occurs instead because the refrigeration cycle, particularly the compressor of the climate control device, absorbs power from the engine of the vehicle, i.e., uses fuel, which in turn produces carbon dioxide, which causes the greenhouse effect.

One of the solutions proposed in order to minimize direct contribution to the greenhouse effect is the use of gases that are alternative to the normal gases currently used in refrigeration cycles.

However, the use of these alternative gases entails the drawback that they reach pressures and temperatures for which the polymeric materials currently used for the tubing of the refrigeration device are unsuitable.

SUMMARY OF THE INVENTION

The aim of the present invention is to provide a device and a method for reducing the permeability of the gas used in a refrigeration cycle from the tubing through which it passes, regardless of which gas is used.

Within this aim, an object of the present invention is to provide a device and a method for reducing gas permeability that can be used both for fixed installations of refrigeration systems, climate control systems and air conditioning systems, and for the same systems installed on vehicles.

Another object of the present invention is to provide a device and a method for reducing permeability in air conditioning, climate control and refrigeration systems that are highly reliable, relatively simple to provide and at competitive costs.

This aim and these and other objects that will become better apparent hereinafter are achieved by a device for reducing the permeability of tubing in climate control, air conditioning and refrigeration systems, characterized in that it comprises means for recovering gas escaped by permeation from at least one tube that is at a first temperature and pressure, adapted to convey said permeated gas to a region of said system that is at a second temperature and pressure, said second pressure being lower than said first pressure.

BRIEF DESCRIPTION OF THE DRAWINGS

Further characteristics and advantages of the invention will become better apparent from the description of preferred but not exclusive embodiments of the device and the method according to the present invention, illustrated only by way of non-limitative example in the accompanying drawings, wherein.

DESCRIPTION OF THE PREFERRED EMBODIMENTS

Figure 1:
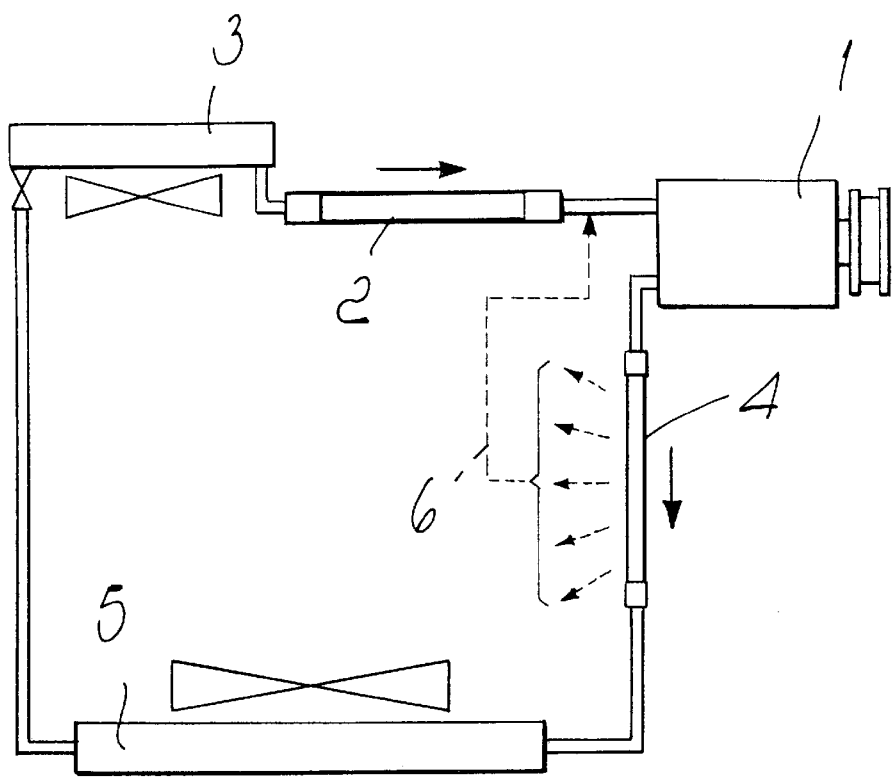
FIG. 1 is a schematic view of the inventive concept of the device and of the method according to the present invention, applied to a climate control system.

With reference to the figures, the device for reducing gas permeation in climate control, air conditioning and refrigeration systems for vehicles and fixed installations generally comprises at least one compressor 1, which is connected by means of a low-pressure, low-temperature tube 2 to an evaporator 3 in order to receive a gas in input from the tube 2 and introduce it in a tube 4 that is arranged downstream of the compressor, at a higher temperature and pressure than in the tube 2.

The gas then passes from the tube 4 to a gas cooling unit 5 and is then sent back to the evaporator.

The greatest gas permeation occurs at the tube 4, where the pressure and temperature are higher.

The inventive concept on which the present invention is based consists in providing means for recovering the gas that permeates from the tube 4 in order to return such gas in input to the compressor.

Substantially, gas recovery occurs by conveying the gas that escapes by permeation from the tube 4 (or from the tube/connector interface) at a high temperature and pressure to a region of the system that has a lower temperature and pressure.

In FIG. 1, the gas recovery means are schematically designated by the reference numeral 6.

Figure 2:
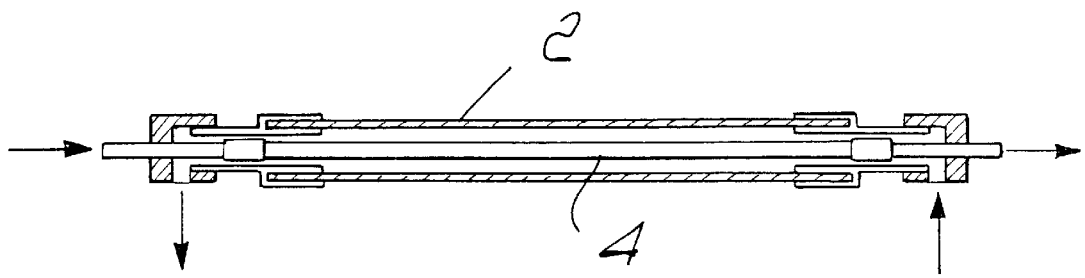
FIG. 2 is a schematic view of a first example of embodiment of the gas recovery system used in FIG. 1.

In detail, the recovery of gas that escapes from the tube 4 in order to reintroduce it in a region at lower temperature and pressure, thus utilizing the pressure gradient, can be performed, as shown in FIG. 2, by inserting the delivery tube 4 coaxially inside the intake tube 2, which is at a lower temperature and pressure than the tube 4. Accordingly, the gas that permeates from the tube 4 finds itself in the interspace between the tube 4 and the tube 2 and is therefore returned to the compressor, thus reducing the quantity of refrigeration gas that normally permeates into the outside environment from the tubes.

Figure 3:
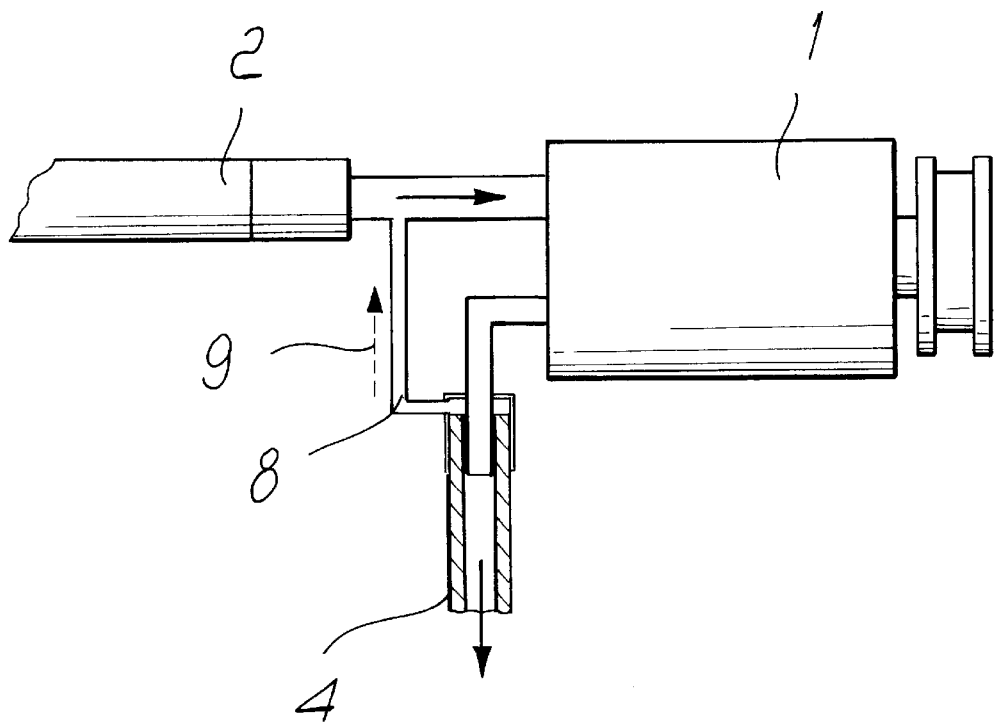
FIG. 3 is a view of a second example of the gas recovery system used in FIG. 1.

A second solution for recovering the gas permeated from the tube 4 is shown in FIG. 3, in which the permeating gas is conveyed to an accumulation chamber formed at the tube 4 and is then sent by way of a duct 8 to the intake of the compressor 1 together with the normal stream of refrigeration gas that flows within the tube 2.

In this case also, therefore, the gas permeated from the tube 4 is recovered, recovering it directly from an accumulation chamber that is formed within the tube 4 and sending it to the outlet of the tube 2. The flow of the recovered gas, indicated by the dashed arrow 9, is facilitated by the existing pressure difference.

Accordingly, the device and the method according to the invention allow to reduce the permeation of gas from tubing of a climate control, air conditioning and refrigeration system in which the pressures are high, conveying the permeated gas to a region of the system that is at lower temperature and pressure.

This allows to reduce the contribution to the direct warming of the atmosphere.

The device and the method thus conceived are susceptible of numerous modifications and variations, all of which are within the scope of the appended claims.

All the details may further be replaced with other technically equivalent elements.

The disclosures in Italian Patent Application No. MI2002A000888 from which this application claims priority are incorporated herein by reference.

What is claimed is:

1. A device for reducing the permeability of tubing in climate control, air conditioning and refrigeration systems, comprising means for recovering gas escaped by permeation from at least one tube that is at a first temperature and pressure, adapted to convey said permeated gas to a region of said system that is at a second temperature and pressure, said second pressure being lower than said first pressure.

2. The device according to claim 1, wherein said tube from which said gas escapes by permeation is connected downstream of a compressor and said region into which said recovered gas is conveyed is located upstream of said compressor, in output from a tube in which said gas is at said second temperature and pressure.

3. The device according to claim 1, wherein said means for recovering gas permeated from said tube at said first temperature and pressure are constituted by said tube that is at said first temperature and pressure, arranged coaxially within said tube that is at said second temperature and pressure.

4. The device according to claim 1, wherein said means for recovering gas escaped by permeation from said tube at said first and second temperatures and pressures comprise an accumulation chamber, which is arranged within said tube that is at said first temperature and pressure and means for conveying the gas contained in said chamber toward the region at low pressure at said second temperature and pressure, in order to convey said gas and said permeated gas to said compressor.

5. The device according to claim 3, wherein said tube at said first temperature and pressure and said tube at said second temperature and pressure are metallic and/or polymeric tubes or are made of a compound of the two materials.

6. Use of a device according to claim 1 in a climate control system or in an air conditioning system, or in a refrigeration system.

7. A method for reducing the permeation of a gas from a tube of a climate control, air conditioning and refrigeration system, comprising the steps of:

recovering gas permeated from said tube that is at high pressure and temperature;

conveying said gas collected from said tube that is at high pressure and high temperature to a region of said system that is at a lower temperature and pressure;

returning into circulation said permeated gas conveyed to said region of said system that is at a lower temperature and pressure than the tube from which said gas is permeated.

* * * * *